United States Patent

Wawra et al.

(10) Patent No.: US 6,556,917 B1
(45) Date of Patent: Apr. 29, 2003

(54) NAVIGATION DEVICE FOR A LAND-BOUND VEHICLE

(75) Inventors: Martin Wawra, Düsseldorf (DE); Ralph Behrens, Harsum (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/830,596

(22) PCT Filed: Aug. 25, 2000

(86) PCT No.: PCT/DE00/02914
§ 371 (c)(1),
(2), (4) Date: Jun. 25, 2001

(87) PCT Pub. No.: WO01/16563
PCT Pub. Date: Mar. 8, 2001

(30) Foreign Application Priority Data

Sep. 1, 1999 (DE) .......................... 199 41 477

(51) Int. Cl.[7] .......................... G01S 13/00; G08G 1/123
(52) U.S. Cl. ........................ 701/207; 340/990
(58) Field of Search .................. 701/200–203, 701/207–209, 211–213, 215; 340/933, 937, 944, 988–999; 342/457, 458, 461, 357.07–357.09, 357.1, 357.11–357.13

(56) References Cited

U.S. PATENT DOCUMENTS

| | | | |
|---|---|---|---|
| 5,289,572 A | | 2/1994 | Tokunaga |
| 5,751,228 A | * | 5/1998 | Kamiya et al. ............. 340/988 |
| 5,787,383 A | * | 7/1998 | Moroto et al. ............. 701/210 |
| 5,948,040 A | * | 9/1999 | DeLorme et al. ........... 701/201 |
| 6,266,442 B1 | * | 7/2001 | Laumeyer et al. .......... 382/190 |
| 6,266,614 B1 | * | 7/2001 | Alumbaugh ................ 701/211 |
| 6,285,317 B1 | * | 9/2001 | Ong ....................... 342/357.13 |

FOREIGN PATENT DOCUMENTS

| | | |
|---|---|---|
| EP | 0 378 271 A | 7/1990 |
| EP | 0 738 876 A | 10/1996 |
| EP | 0 841 537 A | 5/1998 |
| EP | 0 875 729 A | 11/1998 |
| WO | 98 35311 A | 8/1998 |

* cited by examiner

Primary Examiner—Thu Nguyen
(74) Attorney, Agent, or Firm—Michael J. Striker

(57) ABSTRACT

A navigation device for a land-based vehicle is used to support the driver in navigating. The navigation device includes a processor (1), a signal processing means (2), an acoustical and optical display (3), an input device (4), a memory (5), a transceiver (6), an antenna (7), an image processing means (8), a camera (9), a sensor system (10), and a locating device (11). The navigation device according to the invention allows a switchover between a two-dimensional and a perspective display, and it allows a free choice of the point of view for the perspective display.

10 Claims, 1 Drawing Sheet

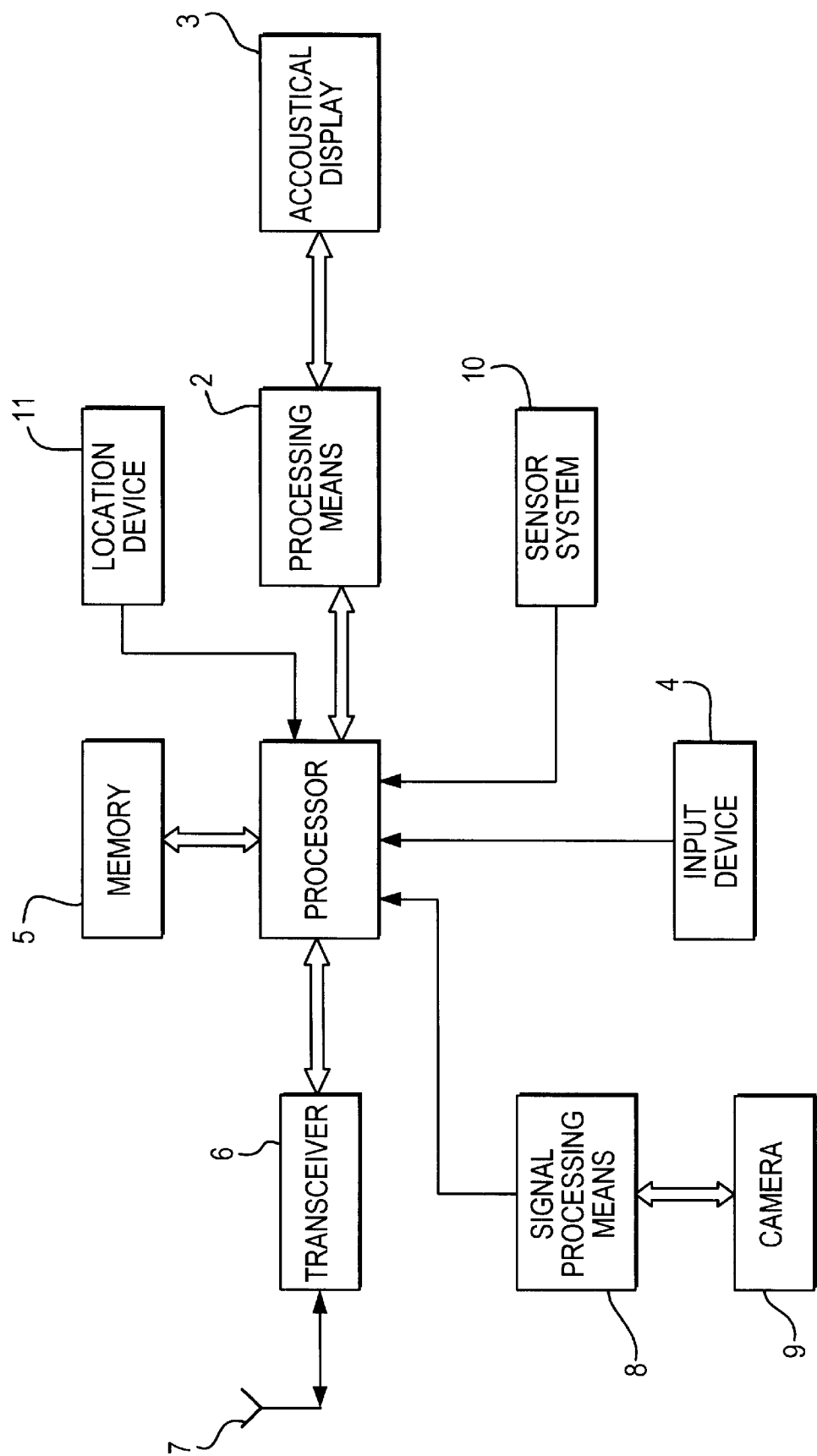

NAVIGATION DEVICE FOR A LAND-BOUND VEHICLE

BACKGROUND OF THE INVENTION

The invention is based on a navigation device for land-based vehicles.

It is already known that navigation devices with a perspective display of the region where a land-based vehicle is located are available. A user inputs a route, and then during the trip the user is guided by the navigation device, with both optical and acoustical guidance being possible. By means of a locating device with which the navigation device is connected, the location of the vehicle is ascertained. The user can change his route during the trip and can input this at the navigation device. Scenes to be displayed are stored in memory in the navigation device in a format determined by the manufacturer.

SUMMARY OF THE INVENTION

The navigation device of the invention for a land-based vehicle has the advantage over the prior art that a choice is offered to the user between a two-dimensional and a perspective display, so that the user can advantageously choose a type of display suited to his needs.

It is also advantageous that the user can choose an arbitrary point of view in the display, so that he himself advantageously determines what objects will be located in his field of view.

It is furthermore advantageous that the scene to be displayed is put together from objects, so that updating of the objects, such as a construction site or new buildings, is realized in a simple way.

It is also advantageous that the user calls up items of information linked with the individual objects, so that he advantageously receives information important to him quickly and simply. The user thus gains a major advantage in terms of time.

By the provisions recited in the dependent claims, advantageous refinements of and improvements to the navigation device for a land-based vehicle defined by the independent claim are possible.

It is especially advantageous that by marking of objects on the part of the user, items of additional information for these objects can be called up on the optical display. This enables the user to call up more-extensive information on these objects, for instance information about a sight worth seeing.

An advantageous refinement is that the objects in the optical display are linked with communication means, so that messages can be sent from the user to persons who are linked with these objects by means of an address. This makes it possible for instance to get into contact quickly with service providers at a certain location.

It is also advantageous that the user optically views any predetermined route by means of the navigation device without having to drive the route itself, so that in a simple way he simulates a possible trip. This leads to optimizing of route planning for a user. With such a simulation, it is furthermore possible to make a first image of certain local features and to remember prominent objects.

It is also advantageous that the navigation device is connected to a recognition device for objects, so that by means of this recognition device, objects in front of a vehicle can be detected and then compared by the navigation device with objects for this location stored in memory, making it possible then to update the object-oriented display of the navigation device.

In an advantageous refinement, the navigation device is connected to a transceiver for sending and receiving wireless signals. This makes it possible to receive information, such as audio or video data, by means of this transceiver so that the information can then be displayed by the navigation device. Thus an enormous quantity of additional information for the display of the navigation device is available.

It is furthermore advantageous that the navigation device is connected to a sensor system of the land-based vehicle, so that the navigation device receives data about the vehicle and then displays these data for the user. This makes it possible to give the user warning signals about the status of his vehicle, if necessary, by means of the navigation device.

It is also advantageous that the navigation device displays the range of the land-based vehicle with the energy reserves still available. This enables the user to plan the energy consumption of the land-based vehicle efficiently.

It is also advantageous that the data administered and received by the navigation device, that is, data signals, audio signals or video signals, are administered the MPEG4 format. This well known coding standard for multimedia data enables the navigation device to access many data sources without having to reformat the data. In particular, this facilitates communication with data sources remote from the land-based vehicle.

It is also advantageous that the optical display of the navigation device is made simpler as the speed of the land-based vehicle increases, to make it easier for the driver to concentrate. Also, there is then less to distract the driver from the traffic.

In an advantageous refinement of the invention, the user provides specifications for how precisely the objects on the optical display of the navigation device will be shown This leaves it to the user what precision he demands from the display on the navigation device. If the user chooses a simpler display, with fewer details, the result is a faster display, as appropriate for high-speed driving; in actuality, the user does not precisely recognize the objects themselves, nor should he be distracted by a precise display.

It is furthermore advantageous that the user is provided with additional indications by the navigation device that are incorporated into the optical display, so that he can more easily reach his destination. This makes it possible for the user, with the aid of the navigation device of the invention, to reach his goal safely even if visibility is poor.

BRIEF DESCRIPTION OF THE DRAWING

Exemplary embodiments of the invention are shown in the drawing and described in further detail in the ensuing description.

FIG. 1 shows a navigation device according to the invention.

DETAILED DESCRIPTION OF THE PREFERRED EMBODIMENTS

Navigation devices are used for graphically and acoustically reinforced route guidance; it is helpful if the display on a monitor of the navigation device reflects reality as precisely as possible for a user driving a land-based vehicle. This makes it easier to recognize an actual scene. Acoustical indications by the navigation device also provide better guidance of the user to his destination.

In FIG. 1, a navigation device according to the invention is shown. The navigation device has a processor 1. Via a first input/output, the processor is connected to a signal processing means 2. The signal processing means 2 prepares the data, which are transmitted by the processor 1 to the signal processing means 2, for display using the optical and acoustical display 3 connected to the signal processing means 2, so that the data can then be shown by means of the optical and acoustical display 3. To that end, the signal processing means 2 converts the data arriving from the processor 1 into signals suitable for the optical and acoustical display 3. The optical and acoustical display 3 has a monitor for the optical display and a speaker for the acoustical display. The signal processing means 2 can alternatively be integrated with the processor 1. A separation of the processor 1 and the signal processing means 2 as presented here puts less of a burden on the processor 1, making the processor 1 available for other tasks as well.

Via a second input/output, the processor 1 is connected to a memory 5. This memory 5 has the data with which the acoustical and optical display is reached. The processor 1 calls up the necessary data from the memory 5 for a certain region, so that it can produce a perspective display or a two-dimensional display, for instance. Besides these data, the memory 5 also contains optical data that encode acoustical signals. These acoustical signals serve to provide acoustical indications to the user during a trip.

Via a first data input, the processor 1 is connected to a locating device 11, which for example is a GPS (Global Positioning System) receiver. As coordinates, the locating device 11 furnishes the location of the land-based vehicle to the processor 1, because the locating device 11 is part of the navigation device of the invention and is built in directly beside the other elements of the navigation device, such as the processor 1, so that the location of the locating device 11 is the same as the location of the navigation device. The processor 1 then has ongoing information about the current location of the land-based vehicle.

Via a third input/output, the processor is connected to a transceiver 6 for sending and receiving wireless signals. An antenna 7 is connected to the transceiver 6 via an input/output. By means of the antenna 7 and the transceiver 6, wireless signals are received that contain data, such as audio or video data, that are then sent on to the processor 1. The transceiver 6 converts the received wireless signals into a digital data stream. A receiving part of the transceiver 6 is a DAB (Digital Audio Broadcasting) radio receiver, by way of which multimedia data for the display on the navigation device are received in a simple way.

DAB is a digital radio transmission method that has a frame structure, which permits transmitting data in various sizes; these data have audio, video or text data. The frames are evaluated by the DAB receiver, and the data that have the frames are then used by means of the navigation device to play back a brief video sequence, for instance displaying the rooms of a hotel.

DAB was designed especially for mobile reception of broadcast signals, making DAB suitable for the reception of multimedia data by a land-based vehicle, and a DAB receiver is generally procured predominantly for broadcast radio reception. If there is already a DAB receiver in the land-based vehicle, then the navigation device of the invention is connected to this DAB receiver, so that the DAB receiver is used as the receiver part of the transceiver 6. The transmitter part of the transceiver 6 is then either remote from the navigation device or is contained in the navigation device.

A data service provider for navigation devices receives its data by means of DAB; such a data service provider can also be a hotel that is offering its services. An access authorization for these data is integrated into the navigation device of the invention in the form of a key for deciphering the received data, but it can also be provided that the data remain unenciphered, since the data can be received only by a suitably equipped navigation device.

Besides DAB, other known digital broadcasting methods such as DVB (Digital Video Broadcasting) and DRM (Digital Radio Mondial) offer the capability of transmitting multimedia data. DVB and DRM differ from DAB for instance in the frame structure, the transmission frequency range, and the transmission bandwidth.

A transmitter part of the transceiver 6 is a GSM (Global System for Mobile Communication) transmitter station, with which other data are transmitted in a simple way along with speech signals. The GSM transmitter station is either a unit remote from the navigation device of the invention, connected for example to the DAB receiver, or an element of the navigation device itself.

GSM is a standard used worldwide for digital wireless mobile communications. Since GSM was designed especially for mobile communications, GSM is suitable for operation in a land-based vehicle. Besides GSM, all other mobile radio standards, such as UMTS (Universal Mobile Communication System) are suitable as transmission methods for the transmitter part of the transceiver 6.

Besides GSM, expansions of the GSM standard are also suitable for this purpose. These include GSM+ and GPRS (General Packet Radio Service); what is essential in this respect is that GPRS in particular transmits the data in packets.

The processor 1 will also forward data to the transceiver 6 that are then sent as wireless signals by means of the antenna 7. For instance, an e-mail can be sent by the user to a hotel, which has been marked as an object on the optical and acoustical display 3, in order to ask whether a room can be reserved. As received data, an example is information from a theater about its schedule of performances or from a supermarket about special offers at the time. This information is then shown in multimedia fashion (image, sound, text and video) by means of the navigation device.

Via a second data input, the processor 1 is connected to an input device 4. This input device 4 is embodied as a keyboard. However, it can also be a touch screen, that is, a screen in which inputs are made by touching the screen, or a mouse or can be achieved simply by means of speech input. The input device 4 has a signal processing means for converting user inputs into electrical signals, because the user often makes the inputs at the input device 4 by means of mechanical signals, such as pressing a key, or by speech signals.

By means of the input device 4, the user indicates his route, and these data are then forwarded to the processor 1 so that the processor 1 then calls up the appropriate data from the memory 5 to forward those data then to the signal processing means 2, so that they are displayed on the optical and acoustical display 3.

The user is also in a position to mark certain objects on the optical display 3 using the input device 4; this marking is forwarded as a datum to the processor 1, so that the processor 1 associates the appropriate object with this marking. Additional information connected to this object is called up by the processor 1 from the memory 5 or by the transceiver 6 from an external data source. It is thus possible for an object itself to broadcast such additional information by means of wireless signals. For instance, a museum can broadcast its hours and important items on exhibition by means of wireless signals in the form of items of additional information by means of a DAB signal.

The user is also given the capability by means of the input device 4 of choosing the type of optical display. As display modes, the user has the perspective display and the two-dimensional display available. In the case of the perspective display, the user is also free to choose any arbitrary point of view.

Once the user has indicated a route by means of the input device 4, it is possible for him to view a simulation of this route by means of the optical and acoustical display 3. If the user has chosen the simulation by means of the input device 4, the processor 1 calls up the appropriate data from the memory 5, so that it can display the route on the optical and acoustical display 3. The user is also free to choose the time factor with which the route is shown on the optical and acoustical display 3.

The user can therefore view the simulated travel of the route faster than in real time, using a time compressor. Routes that cannot even be traveled with a land-based vehicle can be set as well. The prerequisite is that the necessary data be on hand in the memory 5, or that the data can be called up from external data sources using the transceiver 6.

Via a third data input, the processor 1 is connected to a signal processing means for image recognition, which in turn is connected via an input/output to a camera 9. The camera 9 is placed on the land-based vehicle in such a way that the view to the front of the vehicle can be observed by this camera. Angles can also be set with regard to the azimuth angle and elevation angle. Actuators are provided on the camera 9 that allow this change of angle. An example of such actuators are electric motors.

The camera 9 is also embodied as a night vision device. To that end, the camera 9 has an infrared or residual-light-amplifying receiver. Software for image recognition is found in the signal processing means 8. For an image that the camera 9 has taken, the individual objects are analyzed and associated with certain objects. These data are then forward to the processor 1 by the signal processing means 8. The processor 1 then compares these data, which are associated with the recognized objects, with object data that are stored in the memory 5. Furthermore, the processor 1 compares only these object data from the memory 5 that are used at the moment for the display. If the objects match, then the optical display 3 is preserved unchanged; if there is any discrepancy, then the objects are inserted into the optical display 3 in accordance with the coordinates at which the camera 9 took the picture of those objects and as applicable replace obsolete objects, that is, objects that are no longer present.

One example of this is when a traffic light changes from red to yellow, so that this change is also duplicated in the optical and acoustical display 3. To that end, the camera 9 detects that the light is changing from red to yellow; now the object is the traffic light, which has changed to yellow and is recognized by the signal processing means 8 by means of image processing software. This is forwarded to the processor 1 by the signal processing means 8. The processor 1 compares it with the light displayed at the moment, which is showing red, and recognizes the discrepancy and uses the new object, or in other words the light now showing yellow that the camera 9 has taken a picture of, for the display shown on the optical display 3.

Via a fourth data input of the processor 1, a sensor system 10 of the land-based vehicle is connected. The sensor system 10 furnishes measurement data from the land-based vehicle to the processor 1. Examples of such data are the fuel reserve, or energy reserve in the case of a battery-operated vehicle, the tire pressure, the inside temperature, the oil level, and the coolant temperature, and these data are forwarded to the processor 1. The processor 1 puts these measurement data on the optical and acoustical display 3 by means of the signal processing means 2, so that the user is informed of critical values pertaining to his land-based vehicle. The incorporation is done as a function of preset warning values for the various sensor values. For example if the fuel level is measured as being below a predetermined value, then via the optical and acoustical display 3, the user is warned that the tank needs refilling.

In the case of a preset two-dimensional display of the current region, the processor 1 also shows a radius, which indicates how far the land-based vehicle can still travel with the existing fuel reserves. Service stations are visually emphasized on the display. This emphasis is done for instance by means of a color that is clearly distinguished from the rest of the display, or by blinking, or by arrows that point to the service stations.

The data that the processor 1 uses for the display are set up as MPEG4 files. MPEG4 is a known, widespread standard for multimedia data and data streams, with which audio, video and text data files can be encoded. That is, MPEG4 means source coding, or in other words in the source coding a data reduction takes place, in that redundant data are removed from the original data to reduce the data size.

The processor 1 takes the MPEG4 files from the memory 5 and decodes these files, so that they can then be shown by means of the signal processing means 2 and the optical and acoustical display 3. In particular, text files are also available, which describe the scene shown and which define which objects are shown in the scene.

MPEG4 files and/or MPEG4 data streams are also called up from external data sources by means of the transceiver 6. Since MPEG4 is a widely respected standard, compatibility with data service providers is easily achieved. For instance, it is possible to receive audio and video data streams, encoded as MPEG4 data streams, about an event by means of the transceiver 6 and to decode them by means of the processor 1 and show them on the acoustical and optical display 3.

This involves text data files, which in particular include a scene that is to be displayed. Then by means of the text files and the object files and optionally object data streams, the processor 1 generates the scene which is then shown by means of the signal processing means 2 and the acoustical and optical display 3. The object files and object data streams are either in the form of MPEG4 files or MPEG4 data streams or in the form of MPEG4-compatible data, which are then converted as needed into MPEG4 data by a real-time translator, which runs in the processor 1, so that the scene can be displayed.

A traffic light has been described here as an object. The traffic light is still linked with the display for a red, yellow and green light. Depending on the event, one or the other linkage with the display is employed.

The objects are also connected to a file of coordinates; that is, as a function of the location of the land-based vehicle, the processor 1 calls up the objects specified for these coordinates in the coordinate file, so that these objects can be displayed. From the sensor system (10) of the land-based vehicle, the processor 1 receives data about the speed of the vehicle. This puts the processor 1 in a position to adapt the precision of the optical display of the navigation device to the speed. At high speeds, which are defined by the exceeding of a predetermined speed value, the optical display is made simpler, because on the one hand the user must concentrate more on the traffic, and on the other, because of his speed, the user no longer fully perceives the actual objects.

By comparison of the current speed with a curve stored in memory in the navigation device, which associates a speed with the precision of the optical display, the precision of the optical display can be adapted precisely to the current speed value.

The optical and acoustical display is displayed by the optical and acoustical display in accordance with predetermined parameters, which the user inputs by means of the input device 4. For instance, the user specifies what details should be shown, that is, only traffic signs and roads and streets, and arbitrary display specifications are made possible. Furthermore, the user can determine whether acoustical indications are to be made or not.

On the monitor, along with the reality being simulated, the navigation device incorporates additional artificial objects, such as pointer arrows.

What is claimed is:

1. A navigation device for a land-based vehicle, comprising: a processor (1), wherein the processor (1) ascertains the location of the land-based vehicle by means of a locating device (11), the navigation device having means (3) for acoustical and optical display, wherein the means (3) for acoustical and optical display shows a region in which the land-based vehicle is located, and wherein a user informs the navigation device of a route by means of an input device (4), and the user adapts the user-selected route on the navigation device during the trip, wherein the means (3) for acoustical and optical display shows the region in perspective, wherein the means (3) for acoustical and optical display assembles a scene to be from objects, wherein the displayed scene is composed of a multitude of objects, wherein the processor (1) links the objects with items of additional information, said items of additional information being displayed using more than one type of medium, wherein the user, by means of the input device (4), calls up the linked items of additional information for the objects, wherein by means of the input device on the navigation device, the user chooses between a two-dimensional display and a perspective display, wherein by means of the input device (4) on the navigation device, the user selects an arbitrary point of view for the perspective display of the route, and wherein by marking the objects using the input device (4), the user calls up items of additional information for the marked objects, wherein the processor (1) administers the objects, the video and audio data, and the additional information in the form of MPEG4 files.

2. The navigation device of claim 1, wherein the processor (1) links the objects with communication means, so that by means of the communication means, the user sends messages to addressees that are linked with the marked objects.

3. The navigation device of claim 1, wherein the user views a user-selected route by means of the display on the navigation device with an adjustable scheduled time to reach a destination.

4. The navigation device of claim 1, wherein the processor (1) is connected to a recognition device (9) for objects, wherein the recognition device (9) informs the processor (1) of the detected objects for a location, and wherein the processor (1) compares the detected object with an object which the navigation device has stored for this location in a memory (5), so that the navigation device updates the optical display of the user-selected route using current objects, if the detected object differs from the object stored in memory.

5. The navigation device of claim 1, wherein the processor (1) is connected to a transceiver (6) for sending and receiving wireless signals, so that by means of the transceiver (6), the navigation device receives, processes and displays audio data and video signals.

6. The navigation device of claim 1, wherein the processor (1) receives from the land-based vehicle the status of the land-based vehicle and displays it for the user.

7. The navigation device of claim 6, wherein the navigation device, in a two-dimensIonal display, displays a current range of the land-based vehicle from the current location where the land-based vehicle is located.

8. The navigation system of claim 1, wherein as the speed of the land-based vehicle increases, the processor (1) makes the optical display simpler.

9. The navigation system of claim 1, wherein the navigation device displays the objects optically in accordance with predetermined settings.

10. The navigation system of claim 1, wherein the navigation device incorporates additional indications into the region displayed by the means for optical display.

* * * * *